(12) United States Patent
Ishida et al.

(10) Patent No.: US 9,068,242 B2
(45) Date of Patent: Jun. 30, 2015

(54) VALUABLE METAL LEACHING METHOD, AND VALUABLE METAL COLLECTION METHOD EMPLOYING THE LEACHING METHOD

(75) Inventors: Hitoshi Ishida, Ehime (JP); Yukie Kawakami, Ehime (JP); Keiji Kudo, Ehime (JP); Satoshi Asano, Ehime (JP)

(73) Assignee: SUMITOMO METAL MINING CO., LTD., Tokyo (JP)

( * ) Notice: Subject to any disclaimer, the term of this patent is extended or adjusted under 35 U.S.C. 154(b) by 16 days.

(21) Appl. No.: 13/976,160

(22) PCT Filed: Jan. 27, 2012

(86) PCT No.: PCT/JP2012/051832
§ 371 (c)(1),
(2), (4) Date: Jun. 26, 2013

(87) PCT Pub. No.: WO2012/102384
PCT Pub. Date: Aug. 2, 2012

(65) Prior Publication Data
US 2013/0269484 A1    Oct. 17, 2013

(30) Foreign Application Priority Data

Jan. 27, 2011  (JP) ................. 2011-015404

(51) Int. Cl.
*C22B 7/00*    (2006.01)
*C22B 23/00*   (2006.01)
*C22B 26/12*   (2006.01)
*C22B 3/00*    (2006.01)
(Continued)

(52) U.S. Cl.
CPC .............. *C22B 7/006* (2013.01); *C22B 7/007* (2013.01); *C22B 23/0415* (2013.01); *C22B 26/12* (2013.01); *H01M 4/525* (2013.01); *H01M 10/0525* (2013.01); *H01M 10/54* (2013.01)

(58) Field of Classification Search
CPC .... C22B 7/007; C22B 7/006; C22B 23/0415; C22B 26/12; H01M 10/54
USPC ........................................................... 75/743
See application file for complete search history.

(56) References Cited

U.S. PATENT DOCUMENTS 6,835,228 B1 *  12/2004  Lin et al. .......................... 75/420
2011/0059339 A1 *  3/2011  Yamasaki et al. ............... 429/49

FOREIGN PATENT DOCUMENTS

FR    2812973 A1 *  2/2002  .............. H01M 6/52
JP    A-6-346160       12/1994
(Continued)

OTHER PUBLICATIONS

Machine translation of FR 2812973 published Feb. 15, 2002.*
(Continued)

*Primary Examiner* — George Wyszomierski
*Assistant Examiner* — Tima M McGuthry Banks
(74) *Attorney, Agent, or Firm* — Oliff PLC (57) ABSTRACT

The present invention provides a valuable metal leaching method and a valuable metal collection method, in each of which valuable metals can be leached efficiently, the amount of a reducing agent used can be reduced, and cost reduction can be achieved. In the present invention, a positive electrode material is immersed in an acidic solution together with a metal having a lower reduction potential than a reduction potential of hydrogen, whereby valuable metals are leached out from a positive-electrode active substance.

7 Claims, 4 Drawing Sheets

(51) Int. Cl.
*H01M 10/54* (2006.01)
*H01M 4/525* (2010.01)
*H01M 10/0525* (2010.01)

(56) References Cited

FOREIGN PATENT DOCUMENTS

| JP | A-7-207349 | 8/1995 | | |
|---|---|---|---|---|
| JP | A-8-22846 | 1/1996 | | |
| JP | 09082371 A | * 3/1997 | ............ | H01M 10/54 |
| JP | A-10-330855 | 12/1998 | | |
| JP | A-11-293357 | 10/1999 | | |
| JP | A-2003-157913 | 5/2003 | | |
| JP | 2011195948 A | * 10/2011 | | |
| JP | A-2012-36419 | 2/2012 | | |

OTHER PUBLICATIONS

Machine translation of JP 09-082371 published Mar. 28, 1997.*
International Search Report issued in International Patent Application No. PCT/JP2012/051832 dated Mar. 19, 2012 (with translation).

* cited by examiner

VALUABLE METAL LEACHING METHOD, AND VALUABLE METAL COLLECTION METHOD EMPLOYING THE LEACHING METHOD

FIELD OF THE INVENTION

The present invention relates to a valuable metal leaching method of leaching valuable metals from a positive electrode of a lithium ion battery efficiently and at a high leaching rate; and to a valuable metal collection method employing the above-mentioned leaching method.

The present application asserts priority rights based on JP Patent Application 2011-015404 filed in Japan on Jan. 27, 2011. The total contents of disclosure of the Patent Application of the senior filing date are to be incorporated by reference into the present Application.

BACKGROUND OF THE INVENTION

Effective utilization of electric power has been called for against the recent trend of global warming. As one of means of effective utilization of electric power, secondary batteries for electric power energy storage have been expected, and from a viewpoint of air pollution prevention, it has been expected that large-size secondary batteries are put to early practical use as a power source for automobiles. Also, particularly with the proliferation and the performance improvement of electrical equipment, such as digital cameras and cellular phones, the demand of small-size secondary batteries as a power source for backup for computers and the like, or as a power source for small-size electrical household appliances is increasing steadily year by year.

As these secondary batteries, there is required a secondary battery having a performance corresponding to electrical equipment to be used, and, generally, lithium ion batteries are mainly used.

The lithium ion battery is configured such that a negative-electrode material in which a negative-electrode active substance, such as graphite, adheres to a negative-electrode substrate made of copper foil; a positive electrode material in which a positive-electrode active substance, such as lithium nickelate or lithium cobaltate, adheres to a positive-electrode substrate made of aluminum foil; a collector made of aluminum or copper; a separator made of a resin film, such as a polypropylene porous film; and an electrolytic solution, an electrolyte, and the like are enclosed inside an exterior can made of metal, such as aluminum or iron.

While the demand of lithium ion batteries is increasing, establishment of a countermeasure against environmental pollution due to used lithium ion batteries has been strongly desired, and collection of valuable metals and effective use thereof have been considered.

As a method for collecting valuable metals from a lithium ion battery having the above-mentioned structure, for example, dry treatment or incineration treatment, each being disclosed in PTL 1 and PTL 2, has been used. In this case, nickel, cobalt, and the like, valuable metals, are mostly reused for magnets, and the like.

However, dry treatment and incineration treatment have disadvantages that consumption of thermal energy is large and, moreover, lithium (Li) and aluminum (Al) can not be collected. There is also a problem with purity of collected metals, and accordingly the reuse of the collected metals for a lithium ion battery is difficult. Furthermore, there is another problem that, in the case where lithium hexafluorophosphate ($LiPF_6$) is contained as an electrolyte, furnace materials are greatly consumed.

To solve these problems in dry treatment or incineration treatment, there has been proposed a method of collecting valuable metals by wet treatment, as disclosed in PTL 3 and PTL 4. A positive-electrode active substance is dissolved and refined by wet treatment, whereby the positive-electrode active substance can be recycled into Ni metal, Co metal, a metal compound, or a battery material. As this method by wet treatment, there has been proposed a total dissolution method such that all materials resulting from disassembling a lithium ion battery are dissolved by using an acidic solution or the like, and valuable metals are collected. However, in the case of this total dissolution method, a chemical agent is consumed for elements which excessively exist, such as aluminum, copper (Cu), iron (Fe), and the like, and therefore the method is not economical for effectively collecting valuable metals, such as nickel (Ni), cobalt (Co), lithium, and the like.

To solve this problem, there has been proposed a wet treatment using a selectively-peeling-off method, wherein a positive electrode material is selectively peeled off from a lithium ion battery, and valuable metals are efficiently collected from the positive electrode material. In the selectively-peeling-off method of a positive electrode material, generally, a first chemical treatment is such that a positive-electrode active substance containing valuable metals is peeled off from a positive-electrode substrate (positive-electrode foil) (made of Al, or the like). In the treatment of peeling off a positive-electrode substrate, an acidic or alkaline solution is used to peel off a positive-electrode active substance from a positive-electrode substrate. The peeled-off positive-electrode active substance contains trivalent Ni and trivalent Co. To leach Ni and Co, valuable metals, contained in the positive-electrode active substance, the positive-electrode active substance in solid form is made to change into that in liquid form, that is, in metal ion form, in an acidic solution, whereby valuable metals can be leached.

However, since trivalent valuable metals, such as nickel and cobalt, do not dissolve in an acid easily, the valuable metals cannot easily be made to be in metal ion form.

Thus, as a method of leaching out valuable metals, for example, as disclosed in PTL 5, there is a method wherein a reducing agent, such as a sulfite, is added to an acidic solution to make use of the reducing power of the reducing agent. This method enables a compound, such as $LiCoO_2$, or $LiNiO_2$, a positive-electrode active substance, to be decomposed into metal ions effectively and quickly, thereby leaching out valuable metals, such as nickel and cobalt, contained in the positive-electrode active substance.

In such valuable metal leaching method by wet treatment, before leaching out valuable metals, it is necessary to peel off a positive-electrode substrate made of aluminum or the like from a positive-electrode active substance, and this peeling-off causes dissolution of the positive-electrode substrate and accordingly requires a large amount of an alkaline solution. Also, in the leaching out of valuable metal, a reducing agent necessary for dissolution of a positive-electrode active substance requires an equimolar amount of electrons to Ni, Co, and the like, and therefore a more amount of the reducing agent needs to be added. Hence, in such valuable metal leaching method by wet treatment, a more amount of an alkali solution and a more amount of a reducing agent are used, and thereby the expense for leaching out valuable metals is increased accordingly, thus cost effectiveness is reduced.

PRIOR-ART DOCUMENTS

Patent Document

PTL 1: Japanese Patent Application Laid-Open No. Hei 07-207349
PTL 2: Japanese Patent Application Laid-Open No. Hei 10-330855
PTL 3: Japanese Patent Application Laid-Open No. Hei 08-22846
PTL 4: Japanese Patent Application Laid-Open No. 2003-157913
PTL 5: Japanese Patent Application Laid-Open No. Hei 11-293357

SUMMARY OF THE INVENTION

The present invention is proposed in view of such actual circumstances, and aims at providing a valuable metal leaching method of leaching out valuable metals efficiently and at a high leaching rate; and a valuable metal collection method.

The valuable metal leaching method to achieve the above-mentioned aim according to the present invention is a method of leaching out valuable metals contained in a positive electrode material of a lithium ion battery, wherein a positive electrode material is immersed in an acidic solution together with a metal having a lower reduction potential than the reduction potential of hydrogen, whereby valuable metals are leached out from a positive-electrode active substance.

The valuable metal collection method to achieve the above-mentioned aim according to the present invention is a method of collecting valuable metals contained in a positive electrode material of a lithium ion battery, the method comprising a leaching step of leaching out the valuable metals from a positive-electrode active substance by immersing the positive electrode material in an acidic solution together with a metal having a lower reduction potential than the reduction potential of hydrogen.

According to the present invention, when valuable metals are leached out from a positive electrode material constituting a lithium ion battery, the valuable metals can be efficiently leached out at a high leaching rate.

DETAILED DESCRIPTION OF THE INVENTION

Hereinafter, with reference to the drawings, there will be explained in detail a valuable metal leaching method and a valuable metal collection method which employs the leaching method and thereby collects valuable metals from a lithium ion battery according to the present invention.

The present invention provides a method, wherein, when a positive-electrode active substance peeled off and collected from a lithium ion battery is leached in an acidic solution, a compound constituting the positive-electrode active substance is decomposed effectively, and valuable metals are collected from the positive-electrode active substance efficiently and at a high leaching rate.

In the method of collecting valuable metals from a lithium ion battery, one of key chemical treatments is to leach a positive-electrode active substance containing valuable metals with changing the form of the positive-electrode active substance from a solid form to a liquid form, that is, a metal ion form. Conventionally, for this leaching treatment, an acidic solution, such as sulfuric acid, has been used, and, since a compound, such as $LiCoO_2$ or $LiNiO_2$, constituting a positive-electrode active substance, needs to be decomposed, negative electrode powder or the like has been added as an oxygen adsorbent. However, the additive, that is, negative electrode powder or the like, had a weak reducing power in a discharge state, and thus was not capable of effectively and quickly decomposing the compound constituting the positive-electrode active substance, and, as a result, valuable metals from the positive-electrode active substance could not be leached out efficiently and a leaching rate could not be improved.

Therefore, the present invention provides a method, wherein, when a positive-electrode active substance is leached in an acidic solution, a metal having a high reduction effect, that is, a metal having a lower reduction potential than the reduction potential of hydrogen, is added and, with the high reducing power of the metal, a compound, such as $LiCoO_2$ or $LiNiO_2$, contained in the positive-electrode active substance is decomposed effectively and quickly, whereby valuable metals can be leached out from the positive-electrode active substance efficiently and at a high leaching rate.

In the present invention, metals, such as nickel (Ni), iron (Fe), zinc (Zn), and aluminum (Al), may be used as metals to be added in the leaching treatment. Especially preferable among these metals is aluminum because aluminum is used for a positive electrode plate, and accordingly the use of the positive electrode plate as a metal to be added can make it unnecessary to add a reducing agent separately, or can make the amount of a reducing agent separately added smaller than conventionally. A case where aluminum is used will be explained in a first embodiment.

Also, as a metal to be added in the leaching treatment, there is preferably used nickel metal (a porous nickel plate, reduction-roasting powder) collected from a nickel-metal hydride (Ni-MH) battery. By using nickel metal collected from a nickel-metal hydride battery, a metal portion of the nickel-metal hydride battery, which is also to be recycled, is made use of without separately preparing a new reducing agent other than a battery material, whereby a positive-electrode active substance including valuable metals can be effectively decomposed without contamination and loss of economical efficiency. A case where nickel metal collected from a nickel-metal hydride battery is used will be explained in a second embodiment.

First Embodiment

A first embodiment is a valuable metal leaching method, wherein, in the leaching out of valuable metals from a positive-electrode active substance of a positive electrode material constituting a lithium ion battery by wet treatment, valuable metals are dissolved in an acidic solution without adding a reducing agent or with adding a small amount of a reducing agent and thereby leached out from the positive-electrode active substance. The above-mentioned valuable metal leaching method is capable of reduction in the amount of chemicals used, cost-reduction, and efficient collection of valuable metals.

In the first embodiment, in wet treatment, a positive-electrode active substance including lithium, nickel, and cobalt, and a positive electrode substrate formed with aluminum foil or the like are dissolved together in an acidic solution, whereby the positive electrode substrate can be used as a reducing agent, and thus the positive-electrode active substance can be reduced by reducing power of the positive electrode substrate. Thus, in the first embodiment, valuable metals can be made into metal ions without adding a reducing agent separately, or with a much smaller amount of reducing agent separately added than conventionally.

Specifically, a valuable metal collection method comprises a leaching step, wherein a positive electrode material of a lithium ion battery is immersed in an acidic solution to dissolve together a positive-electrode active substance and a positive electrode substrate to which the positive-electrode active substance adheres, whereby valuable metals are leached out from the positive-electrode active substance.

Here, the positive-electrode active substance is for example, $LiCoO_2$ or $LiNiO_2$, and includes valuable metals, such as nickel (Ni) and cobalt (Co). The positive electrode substrate is formed with aluminum foil or the like. Note that, as the positive electrode material, which is a raw material of valuable metals, semi-finished products in a manufacturing process of lithium ion batteries, scrap to be collected, and the like are preferably used. Also, it is more preferable that the positive electrode material is made into a clean raw material by pretreatment, such as mesh sorting, if possible.

Figure 1:
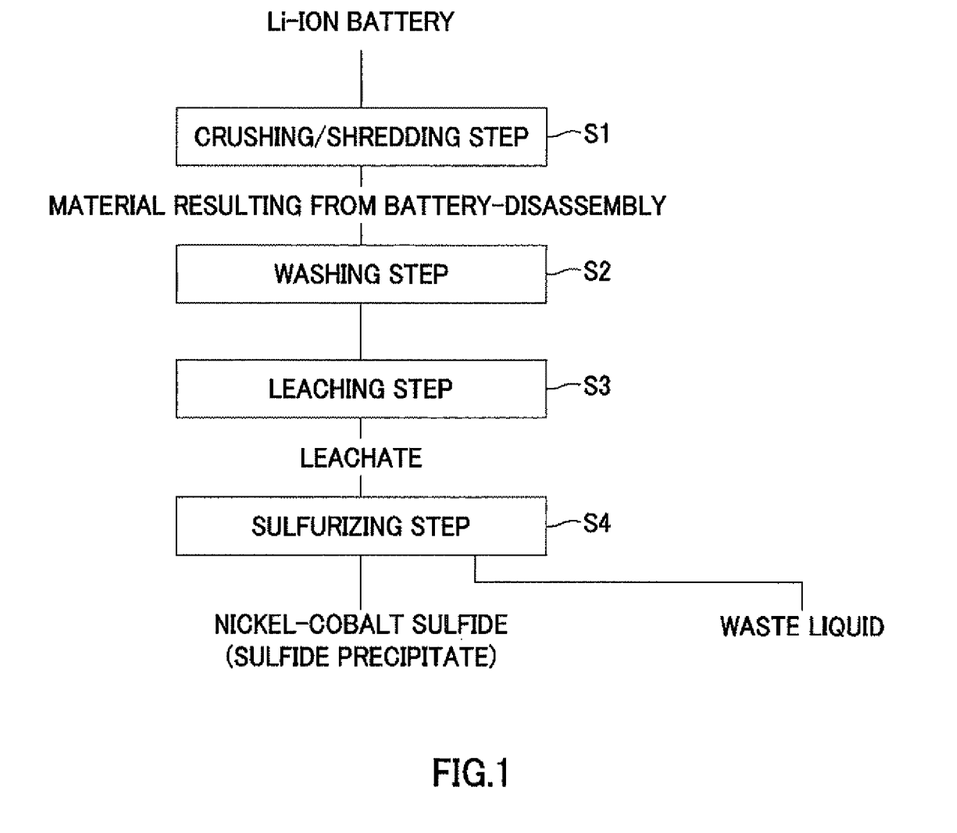
FIG. 1 illustrates a flowchart of a method of collecting valuable metals from a lithium ion battery in a first embodiment.

As shown in FIG. 1, the valuable metal collection method comprises a crushing/shredding step S1, a washing step S2, a leaching step S3, and a sulfurizing step S4. Note that the method of collecting valuable metals from a lithium ion battery is not limited to these steps, but may be suitably changed.

(1) Crushing/Shredding Step

In the crushing/shredding step S1, in order to collect valuable metals from a used lithium ion battery, the battery is disassembled by crushing/shredding. At this time, if the battery is in a charged condition, such condition is dangerous, and therefore the battery is preferably discharged and thereby made harmless prior to being disassembled.

In the crushing/shredding step S1, the battery which is made harmless is disassembled to an appropriate size by using a conventional crusher and a conventional shredder. Also, it may be allowed that an exterior can is cut, and a positive electrode material, a negative-electrode material, and the like inside the exterior can are separated and disassembled, but in this case, each separated part is preferably further cut into an appropriate size.

(2) Washing Step

In the washing step S2, a material resulting from battery-disassembly which is obtained through the crushing/shredding step S1 is washed by alcohol or water, whereby an electrolyte solution and an electrolyte are removed. A lithium ion battery contains organic solvents, such as ethylene carbonate, propylene carbonate, diethyl carbonate, and dimethyl carbonate; and electrolytes, such as lithium hexafluorophosphate ($LiPF_6$).

In the washing of the material resulting from battery-disassembly, alcohol or water is used and the material resulting from battery-disassembly is fed thereinto preferably at a ratio of 10 to 300 g/l, and then shaken or stirred to remove organic components and electrolytes. As the alcohol, ethanol, methanol, isopropyl alcohol, and a mixed solution of these are preferable. Carbonates constituting a battery material are generally insoluble in water, but ethylene carbonate can be arbitrarily dissolved in water, and other organic components also are soluble in water to a certain degree and therefore can be washed by water. Furthermore, when the amount of the material resulting from battery-disassembly with respect to alcohol or water is less than 10 g/l, it is not economical, while when the amount thereof is more than 300 g/l, the material resulting from battery-disassembly is bulky and accordingly difficult to be washed.

The washing of the material resulting from battery-disassembly is preferably repeated two or more times. Also, the washing may be repeated with changing ingredients of a washing liquid, for example, washing is performed using only alcohol first, and then washing is again performed using water. This washing step S2 enables organic components; and phosphorus, fluorine, and the like, each originating from electrolytes, to be removed to such an extent that a downstream step is not affected.

(3) Leaching Step

In the leaching step S3, with the positive-electrode active substance adhering to the positive electrode substrate, the positive electrode material is immersed in an acidic solution, and, with using the acidic solution, dissolution of the positive electrode substrate and leaching out of metal ions of nickel, cobalt, and the like from the positive-electrode active substance are performed simultaneously, whereby a slurry is formed. In the leaching step S3, aluminum or the like, which has a high reduction effect and constitutes the positive electrode substrate, is made to be contained in the acidic solution and therefore a compound, such as $LiCoO_2$ or $LiNiO_2$, contained in the positive-electrode active substance can be effectively and quickly decomposed into metal ions, whereby a leaching rate of valuable metals, such as nickel, cobalt, and the like, contained in the positive-electrode active substance can be improved.

As the acidic solution, mineral acid, such as sulfuric acid, nitric acid, or hydrochloric acid, and, in addition, organic acid or the like may be used. From viewpoints of cost, work environment, and collection of nickel, cobalt, and the like from a leachate, industrially preferable among these is a sulfuric acid solution.

Regarding conditions for the leaching, there exist optimal parameters of each concentration of mineral acid and organic acid, temperature, slurry concentration, stirring speed, and the like, and accordingly it is necessary to select parameters by which an inefficient condition such as a condition requiring a long time for treatment is avoided. Optimal parameters for conditions for the leaching, for example, when using a sulfuric acid solution as an acidic solution, are such that the concentration of sulfuric acid is 0.5 to 10 mol/l; an acidic solution has a pH of 0 to 1; the temperature is not less than 40 degrees C. and less than 100 degrees C.; the concentration of a slurry is 10 to 300 g/l; and the stirring speed is adjusted so as to convect all active substances in a vessel.

The concentration of sulfuric acid is preferably 0.5 to 10 mol/l. When the concentration is higher, the dissolution reaction of a positive-electrode active substance and a positive electrode substrate is quicker. When the concentration is more than 4 mol/l, crystals of nickel sulfate ($NiSO_4$) form more easily. Hence, the concentration of sulfuric acid is most preferably 4 mol/l.

The sulfuric acid solution preferably has a pH of 0 to 1. When the sulfuric acid solution preferably is made to have a pH of 0 to 1, the dissolution reaction of a positive-electrode active substance and a positive electrode substrate starts and an oxidation reduction potential (ORP) (reference electrode: silver/silver-chloride electrode) decreases. Also, as the dissolution reaction of a positive-electrode active substance progresses, the pH of the sulfuric acid solution is increased, and therefore it is preferable that, also during the reaction, sulfuric acid is further added to maintain a pH of approximately 0 to 1. Further more, when the sulfuric acid solution has a pH of more than 1, the positive electrode substrate becomes passivated and ORP increases.

When the sulfuric acid solution has a higher temperature, the dissolution reaction is quicker, and therefore the temperature is preferably not less than 40 degrees C. and less than 100 degrees C., more preferably 70 to 80 degrees C. When the sulfuric acid solution has a temperature lower than 40 degrees C., the dissolution rate is slower.

The concentration of a slurry is preferably 10 to 300 g/l. When the concentration of the slurry is lower than 10 g/l, the amount of fluid to be treated is increased, thereby causing inefficient treatment, while, when the concentration of the slurry is higher than 300 g/l, it is difficult to obtain a uniform slurry due to precipitation or the like, and accordingly a problem of slurry uniformity arises. Therefore, the concentration of the slurry is preferably 10 to 300 g/l.

Note that, in the leaching step S3, if reducing power is not enough to leach out valuable metals after completely dissolving a positive electrode substrate, a reducing agent may be further added. Even in the case where a reducing agent is further added, only with a small amount of the reducing agent added, almost all valuable metals can be leached out from a positive-electrode active substance because the positive electrode substrate is used as a reducing agent as mentioned above. As the reducing agent to be further added, aluminum or the like, with which the positive electrode substrate is formed, is preferable, and sodium sulfite or the like, which has been conventionally used, may be acceptable.

In this leaching step S3, unlike the conventional way, it is not necessary to perform a pretreatment to peel off a positive electrode substrate from a positive-electrode active substance by using an alkaline solution, and thereby valuable metals can be leached out more efficiently, and therefore working efficiency can be improved.

Conventionally, when a positive electrode substrate is separated from a positive-electrode active substance to leach out valuable metals, more chemicals, such as sodium hydroxide, sulfuric acid, and sodium sulfite (reducing agent), have been used, and the cost of treatment of aluminum-containing waste liquid has been required. On the other hand, in this leaching step S3, valuable metals are leached out in an acidic solution by using a positive electrode substrate as a reducing agent, and thus chemicals necessary for separating the positive electrode substrate are not required. Chemicals necessary for leaching out valuable metals are only mainly an acidic solution and a reducing agent to be added as needed, and hence less chemicals are used and thereby cost can be considerably reduced.

Particularly, in the leaching step S3, a positive electrode substrate can be used a reducing agent, and thereby a reducing agent is not required to be further added or, even if a reducing agent is required to be further added, valuable metals to be leached out with less and inexpensive reducing agent, such as aluminum, than conventionally. Thus, a reducing agent, which has the largest impact on cost, is not used, or the amount of a reducing agent used can be considerably reduced, and at the same time, working efficiency can be improved and the amount of other chemicals, such as an alkaline solution, used can also be reduced.

(4) Sulfurizing Step

In the sulfurizing step S4, a leachate obtained through the leaching step S3 is introduced into a reaction vessel and a sulfurizing agent is added thereto to induce a sulfurization reaction and thereby form nickel-cobalt mixed sulfide, whereby nickel (Ni) and cobalt (Co), valuable metals, are collected from a lithium ion battery. As the sulfurizing agent, hydrogen sulfide gas, or alkali sulfide, such as sodium sulfide or sodium hydrosulfide, may be used.

Note that, in the sulfurizing step S4, impurities contained in the leachate, for example, a positive electrode substrate and the like which remain without being dissolved may be removed by pretreatment, such as mesh sorting.

Specifically, in the sulfurizing step S4, nickel ions (or cobalt ions) contained in the leachate form a sulfide by sulfurization reaction with alkali sulfide in accordance with the following chemical formula, (1), (2), or (3).

$$Ni^{2+}+H_2S => NiS+2H^+ \quad (1)$$

$$Ni^{2+}+NaHS => NiS+H^++Na^+ \quad (2)$$

$$Ni^{2+}+Na_2S => NiS+2Na^+ \quad (3)$$

The amount of the sulfurizing agent to be added in the sulfurizing step S4 is preferably, for example, not less than 1.0 equivalent with respect to nickel and cobalt contents in a solution. When the amount of the sulfurizing agent to be added is not less than 1.0 equivalents, each concentration of nickel and cobalt in a solution can be made not more than 0.001 g/l.

However, in operation, it is sometimes difficult to precisely and quickly analyze each concentration of nickel and cobalt in a leachate, and therefore, a sulfurizing agent is more preferably added to the extent that any further addition of the sulfurizing agent does not cause a variation of ORP in a reaction solution. Usually, the reaction is completed in a range of −200 to 400 mV (reference electrode: silver/silver-chloride electrode), and therefore a sulfurizing agent is preferably added based on the ORP value. Thus, nickel and cobalt which are leached out in a solution can be sulfurized sufficiently, and these valuable metals can be collected at a high collection rate.

A solution used for the sulfurization reaction in the sulfurizing step S4 preferably has a pH of approximately 2 to 4. The temperature of the sulfurization reaction in the sulfurizing step S4 is not particularly limited, but preferably 0 to 90 degrees C., more preferably approximately 25 degrees C. When the temperature is higher than 90 degrees C., many economic problems, such as higher cost for raising a temperature, are caused.

In this sulfurizing step S4, by the sulfurization reaction, nickel and cobalt contained in a positive-electrode active substance of a lithium ion battery can be collected as a nickel-cobalt sulfide (sulfide precipitate). In this sulfurizing step S4, the nickel-cobalt sulfide can be separated from impurities and collected, while impurities are made to be contained in waste liquid.

In the above-mentioned valuable metal collection method, between the leaching step S3 and the sulfurizing step S4, there may be performed a neutralization step, wherein impurities originating from a positive electrode material, and contained in the leachate obtained through the leaching step S3, such as aluminum, copper, iron, and chromium, are separated and collected as precipitates.

As a neutralizing agent, common chemicals, such as soda ash, slaked lime, or sodium hydroxide, may be used. These chemicals are inexpensive and can be handled easily.

The solution is preferably adjusted so as to have a pH of 3.0 to 5.5 by adding the above-mentioned neutralizing agent. When the solution has a pH of less than 3.0, aluminum and copper cannot be separated and collected as precipitates. On the other hand, when the solution has a pH of more than 5.5, nickel and cobalt also precipitate and are contained in the precipitates of aluminum and copper, thereby causing a loss, which is not preferable. Note that, even if iron is contained in the solution as another element, the iron can be made to be contained in precipitates and separated together with aluminum and copper.

Since a positive electrode material is immersed in an acidic solution in the above-mentioned leaching step S3, aluminum, copper, iron, chromium, and the like, each originally contained in a positive-electrode active substance, are made to be contained in a leachate, but, in the neutralization step, can be removed before performing a downstream step, namely, sulfurizing step S4, for collecting valuable metals. This neutralization step can further prevent impurities from being mixed into a collected material at the time of collecting valuable metals.

In the above-mentioned valuable metal collection method, at the leaching step S3 for leaching out valuable metals from a positive-electrode active substance, a positive electrode substrate is immersed in an acidic solution to be dissolved together with a positive-electrode active substance, whereby aluminum or the like constituting the positive electrode substrate serves as a reducing agent, and valuable metals can be leached out from the positive-electrode active substance, such as $LiCoO_2$ or $LiNiO_2$. Therefore, in this valuable metal collection method, unlike the conventional way, a pretreatment to peel off a positive electrode substrate from a positive-electrode active substance is not performed, and valuable metals can be leached out more efficiently. Thus, working efficiency can be improved, and valuable metals can be collected efficiently.

Also, in this valuable metal collection method, a positive electrode substrate is used as a reducing agent, and thereby a reducing agent is not required to be further added, or, even if a reducing agent is required to be further added, only a smaller amount of reducing agent than conventionally enables valuable metals to be leached. Thus, in the valuable metal collection method, chemicals required for leaching out valuable metals are only mainly an acidic solution and a reducing agent to be added as needed, and thereby a reducing agent, which has the largest impact on cost, is not used, or the amount of a reducing agent used can be considerably reduced, and at the same time, the amount of other chemicals, such as an alkaline solution, used can also be reduced, whereby cost reduction can be realized.

Second Embodiment

Provided in a second embodiment is a method wherein, when a positive-electrode active substance peeled off and collected from a lithium ion battery is leached in an acidic solution, a compound constituting the positive-electrode active substance is effectively decomposed, and thereby a leaching rate of valuable metals from the positive-electrode active substance is increased to improve a collection rate of valuable metals.

Figure 2:
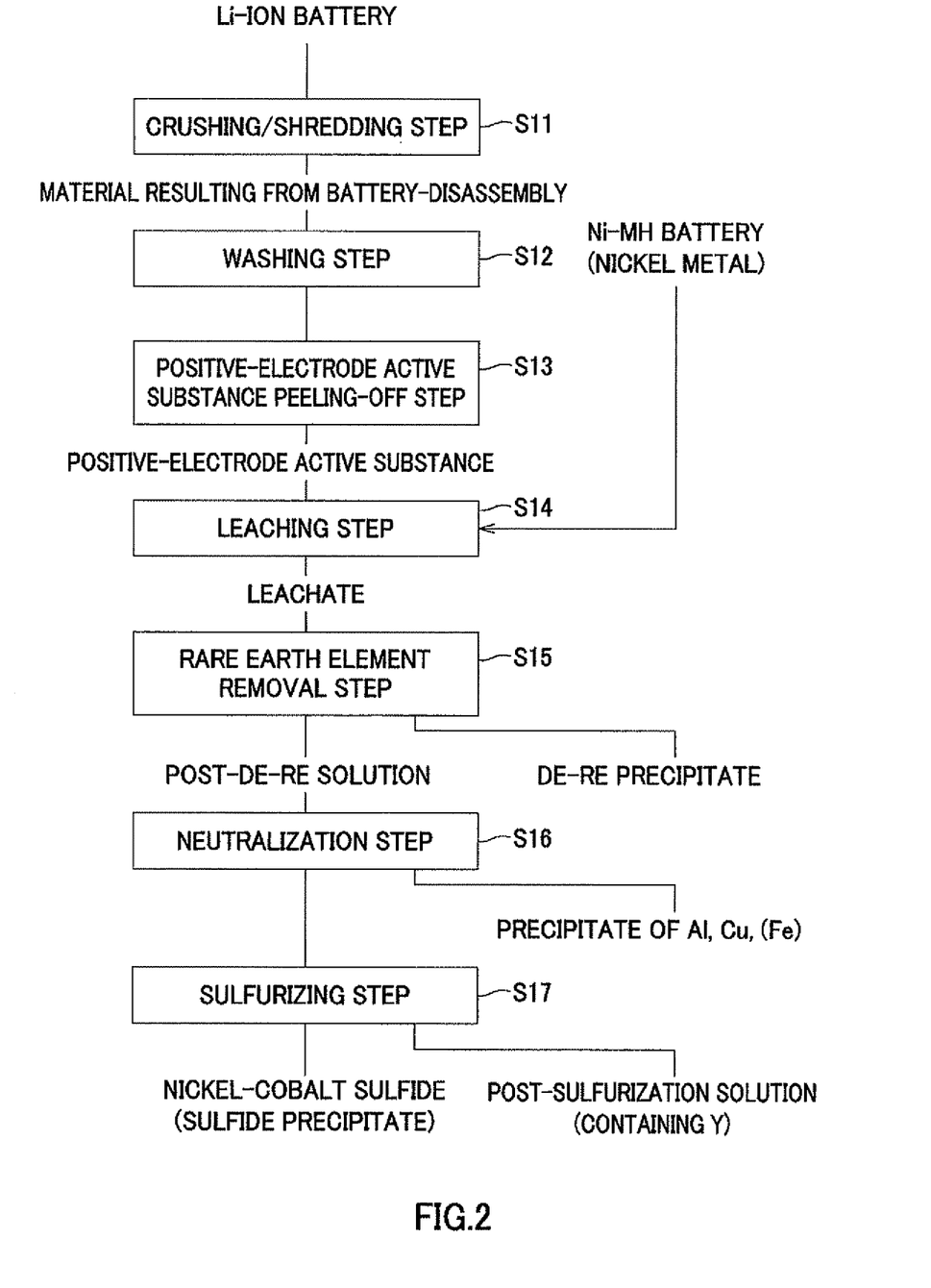
FIG. 2 illustrates a flowchart of a method of collecting valuable metals from a lithium ion battery in a second embodiment.

First, the method of collecting valuable metals from a lithium ion battery according to the second embodiment will be explained with reference to a flowchart shown in FIG. 2. As shown in FIG. 2, the valuable metal collection method comprises a crushing/shredding step S11, a washing step S12, a positive-electrode active substance peeling-off step S13, a leaching step S14, a rare earth element removal step S15, a neutralization step S16, and a sulfurizing step S17. Note that the method of collecting valuable metals from a lithium ion battery is not limited to these steps, but may be suitably changed.

The crushing/shredding step S11 and the washing step S12 are performed in the same way as the crushing/shredding step S1 and washing step S2 in the aforementioned first embodiment, respectively, and therefore detailed explanations are omitted. In the second embodiment, an electrolyte solution and an electrolyte are removed in advance in the washing step S12, and thereby an organic component, phosphorus (P), fluorine (F), and the like can be prevented from being mixed as impurities into a leachate in the positive-electrode active substance peeling-off step S13 mentioned later.

(3) Positive-Electrode Active Substance Peeling-Off Step

In the positive-electrode active substance peeling-off step S13, a material resulting from battery-disassembly obtained through the washing step S12 is immersed in an acidic solution, such as a sulfuric acid solution, or a surfactant solution, whereby a positive-electrode active substance is peeled off and separated from the positive electrode substrate. The positive-electrode active substance still adheres to aluminum foil constituting the positive electrode substrate even after battery-disassembly, but, in the positive-electrode active substance peeling-off step S13, the material resulting from battery-disassembly is fed into an acidic solution, such as a sulfuric acid solution, or a surfactant solution, and then stirred, whereby the positive-electrode active substance and the aluminum foil can be separated in solid form.

Particularly, it is preferable that the material resulting from battery-disassembly is immersed in a surfactant solution and mechanically stirred to peel off a positive-electrode active substance. Thus, dissolution of valuable metals contained in the positive-electrode active substance into a solution can be controlled, whereby collection loss of valuable metals can be prevented.

Note that, in the positive-electrode active substance peeling-off step S13, all the material resulting from battery-disassembly may be immersed in an acidic solution or a surfactant solution, or it is also allowed that only a positive electrode material is selected from the material resulting from battery-disassembly and immersed.

In the case where a sulfuric acid solution is used as an acidic solution, the acidic solution is controlled so as to have a pH of 0 to 3, preferably a pH of 1 to 2. When the sulfuric acid solution has a pH of less than 0, the too high concentration of sulfuric acid causes both aluminum foil and a positive-electrode active substance to dissolve, whereby separation of the positive-electrode active substance from the aluminum foil becomes difficult. On the other hand, when the sulfuric acid solution has a pH of more than 3, the too low concentration of sulfuric acid prevents adhering to the aluminum foil from dissolving, and thereby the positive-electrode active substance is insufficiently peeled off.

The feeding amount of the material resulting from battery-disassembly with respect to a sulfuric acid solution is suitably 10 to 100 g/l. Also, when a lithium ion battery is disassembled by crushing and the like, a positive electrode material and a negative-electrode material are usually in flake form, and therefore may be fed into a sulfuric acid solution as they are, but are preferably cut into pieces having a size of not more than 30 mm in length, in advance. Thereby, the separation can be efficiently performed.

In the case where a surface active agent is used, the type of the surfactant solution to be used is not particularly limited, and a nonionic surfactant, an anionic surfactant, or the like may be used, and these may be used alone, or two or more kinds of these may be used in combination. Specifically, examples of the nonionic surfactant include polyoxyethylene octylphenyl ether, polyoxyethylene nonylphenyl ether, and polyoxyethylene lauryl ether. Examples of the anionic surfactant include alkyl diphenyl ether disulfonate and a salt thereof, bisnaphthalene sulfonate and a salt thereof, polyoxyalkyl sulfosuccinic acid ester and a salt thereof, and sulfuric ester of polyoxyethylene phenyl ether and a salt thereof. Among these kinds of surfactants, a nonionic surfactant having a polyoxyalkylene ether group can be particularly suitably used.

The amount of a surfactant added is preferably 1.5 to 10% by weight. When an amount of a surfactant added is not less than 1.5% by weight, a positive-electrode active substance can be peeled off and collected at a high collection rate. On the other hand, when the amount of a surfactant solution added is not more than 10% by weight, a positive-electrode active substance can be peeled off effectively without an economical loss. Also, the pH of a surfactant solution is made neutral.

Note that a time of separating the positive-electrode active substance in the positive-electrode active substance peeling-off step S13 is different depending on each concentration of a sulfuric acid solution and a surfactant solution, the feeding amount of and the size of a material resulting from battery-disassembly including a positive electrode material, and the like, and therefore it is preferable that the time is experimentally determined in advance.

The material resulting from battery-disassembly which undergoes and completes the positive-electrode active substance peeling-off step is sieved to collect a positive-electrode active substance, such as nickel acid lithium, cobalt acid lithium, and the like, which is separated from a positive electrode substrate; and what accompanies with the positive-electrode active substance. In the case where all the material resulting from battery-disassembly is treated, negative-electrode powder, such as graphite, which is a negative-electrode active substance, and what accompanies with the negative-electrode powder are also collected. On the other hand, a positive electrode substrate portion and a negative electrode substrate portion; an exterior portion can made of aluminum, iron, or the like; a separator portion made of a resin film, such as a polypropylene porous film; and a collector portion made of aluminum or copper (Cu) are separated to be supplied to each treatment step.

(4) Leaching Step

In the leaching step S14, metal ions of nickel, cobalt, and the like are leached out from the peeled-off and collected positive-electrode active substance by using an acidic solution, and then made into a slurry. In this valuable metal collection method, at this leaching step S14, a metal having a high reduction effect, that is, a metal having a lower reduction potential than hydrogen is added.

Thus, by adding a metal having high reducing power and thereby leaching the positive-electrode active substance, with the high reducing power, compounds, such as $LiCoO_2$ and $LiNiO_2$, contained in the positive-electrode active substance can be decomposed effectively and quickly, whereby a rate of leaching out valuable metals, such as nickel and cobalt, contained in the positive-electrode active substance can be improved.

As the metal having high reducing power, there is preferably used a nickel metal (a porous nickel plate, reduction-roasting powder) collected from a nickel hydride battery. Thus, with using nickel metal collected from a nickel-metal hydride battery, it becomes unnecessary to separately prepare a new reducing agent other than a battery material, thereby economizing on a reagent for decomposing a positive-electrode active substance. Furthermore, the use of a metal portion of a nickel-metal hydride battery, which is a battery to be recycled, enables a compound including valuable metals to be effectively decomposed without contamination and loss of economical efficiency.

As the amount of nickel metal added, the nickel metal being collected from a nickel-metal hydride battery, is preferably 0.5 to 2.0 times moles with respect to the number of moles of a positive-electrode active substance to be dissolved. Furthermore, it is preferable to adjust an oxidation reduction potential (ORP) (reference electrode: silver/silver-chloride electrode) to be in a range of −100 to 550 mV by adding nickel metal or blowing air or oxygen. With adjusting an ORP so as to achieve this ORP range, nickel metal is added, whereby the nickel metal can be effectively dissolved.

In this leaching step S14, as the acidic solution used for dissolution of a positive-electrode active substance, besides mineral acid, such as sulfuric acid, nitric acid, or hydrochloric acid, organic acid or the like may be used. Among these, it is industrially preferable to use a sulfuric acid solution from viewpoints of cost, work environment, and collection of nickel, cobalt, and the like from a leachate.

The pH of an acidic solution to be used is preferably 2 at the highest, more preferably controlled to be approximately 0.5 to 1.5 from a viewpoint of reactivity. As dissolution reaction of a positive-electrode active substance proceeds, the pH increases, and therefore it is preferable that acid, such as sulfuric acid, is further added also during the reaction, whereby the PH is maintained at approximately 0.5 to 1.5.

(5) Rare Earth Element Removal Step

In the rare earth element removal step S15, a rare earth element (RE) is precipitated and removed from the leachate obtained in the leaching step S14.

The nickel metal, which is collected from a nickel-metal hydride battery and added in the leaching step S14, includes rare earth elements, such as lanthanum (La), cerium (Ce), and neodymium (Nd), and hence by adding the nickel metal in the leaching step S14, the leachate is made to contain these rare earth elements. When nickel and cobalt, valuable metals, are collected as a sulfide in the later-mentioned sulfurizing step S17, rare earth elements precipitate together with nickel and cobalt, and thereby could cause loss of quality of the nickel-cobalt sulfide. Accordingly, in this rare earth element removal step S15, a treatment is performed to precipitate and remove rare earth elements from a leachate. Thus, rare earth elements are effectively removed from the leachate, whereby valuable metals having high purity can be efficiently collected.

Specifically, in the rare earth element removal step S15, an alkali sulfate, such as sodium sulfate, is added as a de-rare-earth-element agent to a leachate, thereby making a rare earth element into an insoluble double sulfate. The following formula (4) shows a formation reaction of an insoluble double sulfate of a rare earth element. Note that RE in the formula represents a rare earth element.

$$RE_2(SO_4)_3 + Na_2SO_4 + xH_2O \Rightarrow RE_2(SO_4)_3 \cdot Na_2SO_4 \cdot xH_2O \quad (4)$$

An alkali sulfate as a de-rare-earth-element agent is added in crystal form or in solution form, and mixed into a leachate. The addition amount is preferably not less than 10 times moles with respect to de-rare-earth-element to be contained in the leachate.

In the formation reaction of an insoluble double sulfate of a rare earth element, the pH of 0 to 4 is preferable. In the formation reaction of an insoluble double sulfate of a rare earth element, it is suitable that the solution is saturated with an alkali sulfate, and when the pH is low, the reaction occurs without any influence. On the other hand, when the pH is too high, valuable metals, such as nickel and cobalt, precipitate as a hydroxide, thereby causing collection loss of valuable metals.

The reaction temperature is preferably 60 to 80 degrees C. When the reaction temperature is lower than 60 degrees C., there is a possibility that an insoluble double sulfate of a rare earth element cannot be effectively formed with respect to a predetermined amount of an alkali sulfate. On the other hand, when the reaction temperature is too high, costs for raising the temperature are required, which is not efficient.

Thus, in the rare earth element removal step S15, without precipitating nickel, cobalt, lithium, and the like, which are valuable metals to be collected, a double sulfate precipitate of a rare earth element (de-RE precipitate) is formed and filtered, whereby the rare earth element is separated and collected. A solution (post-de-RE solution) obtained through the rare earth element removal step S15 is next transferred to the neutralization step S16.

(6) Neutralization Step

In the neutralization step S16, a filtrate resulting from removal of rare earth elements through the rare earth element removal step S15 (post-de-RE solution) is neutralized by a neutralizing agent, and a small amount of aluminum, copper, and the like, each of which originates from positive and negative electrode substrates, are separated and collected as precipitates.

As the neutralizing agent, common chemicals, such as soda ash, slaked lime, and sodium hydroxide, may be used. These chemicals are inexpensive and can be handled easily.

The solution is preferably adjusted to have a pH of 3.0 to 5.5 by adding the above-mentioned neutralizing agent. When the pH is less than 3.0, aluminum and copper cannot be separated and collected as precipitates. On the other hand, when the pH is higher than 5.5, nickel and cobalt also precipitate and are contained in the precipitates of aluminum and copper, thereby causing a loss, which is not preferable. Note that, even if iron is contained in the solution as another element, the iron can be made to be contained in a precipitate and thereby separated together with aluminum and copper.

(7) Sulfurizing Step

In the sulfurizing step S17, a solution obtained through the leaching step S16 is introduced into a reaction vessel, and a sulfurizing agent is added thereto to induce sulfurization reaction and to form a nickel-cobalt mixed sulfide, whereby nickel and cobalt, valuable metals, are collected from a lithium ion battery. As the sulfurizing agent, hydrogen sulfide gas, or alkali sulfide, such as sodium sulfide or sodium hydrosulfide, may be used.

Specifically, in the sulfurizing step S17, nickel ions (or cobalt ions) contained in the solution form a sulfide by sulfurization reaction with alkali sulfide in accordance with the following chemical formula, (5), (6), or (7).

$$Ni^{2+}+H_2S => NiS+2H^+ \qquad (5)$$

$$Ni^{2+}+NaHS => NiS+H^++Na^+ \qquad (6)$$

$$Ni^{2+}+Na_2S => NiS+2Na^+ \qquad (7)$$

The amount of a sulfurizing agent to be added in the sulfurizing step S17 is preferably, for example, not less than 1.0 equivalent with respect to nickel and cobalt contents in the solution. When the amount of a sulfurizing agent to be added is not less than 1.0 equivalent, each concentration of nickel and cobalt in the solution can be not more than 0.001 g/l.

However, in operation, it is sometimes difficult to precisely and quickly analyze each concentration of nickel and cobalt in a leachate, and therefore, a sulfurizing agent is more preferably added to the extent that any further addition of the sulfurizing agent does not cause a variation of ORP in a reaction solution. For example, when sodium sulfide is to be added as a sulfurizing agent, the ORP value of the saturated solution of sodium sulfide is approximately −200 to 400 mV and hence the sulfurizing agent is preferably added based on the ORP value. Thus, nickel and cobalt which are leached out in a solution can be sulfurized sufficiently, and these valuable metals can be collected at a high collection rate.

The temperature of the sulfurization reaction in the sulfurizing step S17 is not particularly limited, but preferably 0 to 90 degrees C., more preferably approximately 25 degrees C. When the temperature is higher than 90 degrees C., many economic problems, such as higher cost for raising a temperature, are caused.

In the present embodiment, as mentioned above, nickel metal collected from a nickel-metal hydride battery is added in the leaching step S14. It means that rare earth elements contained in the nickel metal are made to be contained in a leachate. As mentioned above, among rare earth elements, lanthanum, cerium, neodymium, and the like can be precipitated and collected in such a manner that a double sulfate thereof is formed by double sulfate precipitation reaction in the rare earth element removal step S15. However, among the rare earth elements contained in the nickel metal, yttrium (Y) does not form a double salt thereof with an alkali sulfate, and therefore cannot be precipitated and collected in the rare earth element removal step S15. Although yttrium, a rare earth element, does not react with a sulfurizing agent in this sulfurizing step S17, a precipitate thereof is formed in hydroxide form, and the precipitate could mix into a nickel-cobalt sulfide, thereby causing loss of quality of the sulfide.

Accordingly, in the present embodiment, the pH of an acidic solution used for sulfurization reaction in this sulfurizing step S17 is adjusted to 2 to 5. When the pH is lower than 2, a nickel-cobalt sulfide resulting from sulfurization reaction is insufficiently formed, and thus a sufficient amount of the sulfide cannot be obtained. On the other hand, when the pH is higher than 5, a precipitate of yttrium is formed in hydroxide form, and the precipitate could mix into the sulfide. In the pH adjustment of the solution, sodium hydroxide, sodium carbonate, or the like is added during sulfurization reaction, whereby the solution is adjusted to a pH of 2 to 5.

Thus, in the present embodiment, at this sulfurizing step S17, sulfurization reaction is generated while the pH is adjusted, whereby a sufficient amount of a nickel-cobalt sulfide (sulfide precipitate) can be obtained from a leachate obtained by leaching out nickel and cobalt at a high leaching rate, and also yttrium can be made to remain in a post-reaction solution (post-sulfurization solution), and accordingly a nickel-cobalt sulfide having a good quality can be obtained.

Other Embodiments

The present embodiment is not limited to the above-mentioned embodiment, but may be suitably changed unless the essentials of the present invention are changed.

(Additive which has a Reducing Effect and is to be Added in the Leaching Step)

For example, as mentioned above, a metal to be added in a leaching treatment of a positive-electrode active substance collected from a lithium ion battery is not limited to nickel metal collected from a nickel-metal hydride battery, or aluminum, but metals, such as nickel, iron, and zinc, may also be used. Also, the metal to be added is not limited to a metal having a lower reduction potential than hydrogen, like these metals, but a water-soluble reducing agent having a high reducing effect, such as sulfite, may also be used.

(Another Embodiment of Sulfurizing Step)

In the above-mentioned sulfurizing step S4 and the above-mentioned sulfurizing step S17, an example of performing sulfurization reaction with an alkali sulfide was explained, but sulfurization reaction may be induced using a hydrogen sulfide as a sulfurizing agent. In other words, the sulfurization reaction using hydrogen sulfide is such that a mother liquor obtained through the leaching step S4 or the leaching step S14 is introduced into a reaction vessel comprising a pressurizing vessel having pressure resistance, and gas for sulfurization containing hydrogen sulfide is blown into a gas phase in the reaction vessel, whereby sulfurization reaction by a hydrogen sulfide is induced in a liquid phase in the reaction vessel.

According to a formula (8) shown below, the sulfurization reaction using hydrogen sulfide is performed at a predetermined oxidation-reduction potential depending on the concentration of hydrogen sulfide in the gas phase.

$$MSO_4+H_2S => MS+H_2SO_4 \qquad (8)$$

(Note that M in the formula represents Ni and Co.)

The pressure in the reaction vessel in the sulfurization reaction of the above-mentioned formula (8) is not particularly limited, but is preferably 100 to 300 kPa. Also, the reaction temperature is not particularly limited, but is preferably 65 to 90 degrees C.

Also in the case of the sulfurization reaction based on the above-mentioned formula (8), it is necessary that, while the pH of a reaction solution is adjusted to 2 to 5, the reaction is performed, whereby Y can be made to remain in a post-reaction solution and a sulfide having a good quality can be obtained.

Note that the method of collecting valuable metals from a lithium ion battery according to the present embodiment is not limited to the method comprising the above-mentioned steps, but may be suitably changed unless the essentials of the present invention are changed.

EXAMPLES

Hereinafter, the present invention will be explained using examples, but the present invention is not limited to these examples. First, an example on the valuable metal leaching method described in the above-mentioned first embodiment will be explained.

Example 1

In Example 1, nickel and cobalt, valuable metals, were collected from a lithium ion battery. First, only a positive electrode substrate made of aluminum foil to which a positive-electrode active substance containing nickel and cobalt adheres, that is, a positive electrode material was used as a raw material and cut into pieces approximately 1 cm square by a double shaft crusher.

This positive electrode material was immersed in 4 mol/l of sulfuric acid solution having a temperature of 80 degrees C., and stirred to perform the dissolution of the positive electrode substrate (Al) simultaneously with the leaching of the positive-electrode active substance. The content of Al of the positive electrode substrate was approximately 10 wt % with respect to a whole of the positive electrode, material, and 30 g of this cut positive electrode material was dissolved at 80 degrees C. to finally obtain 350 ml of solution.

Sulfuric acid was gradually supplied over approximately 1 hour while checking the reaction, and then, after a predetermined amount of sulfuric acid was supplied, stirring and progress of the reaction were maintained, and it was confirmed that all the Al was dissolved for approximately 2 hours and 40 minutes in total. The concentration of the slurry solution was 100 g/l. When Al remained, an ORP of the solution fluctuated in the vicinity of 0 mV, but, as the amount of the Al decreased, the ORP gradually increased, and, at the time of dissolution of the whole amount of the Al, the ORP reached or exceeded 1000 mV.

Then, the amounts of Ni and Co in a leachate and the amounts of Ni and Co which remained in a residue in solid form without being leached were analyzed, and as a result, the leaching rates of Ni, Co, and Al in the positive-electrode active substance were 85.8%, 87.8%, and 99.7%, respectively. Example 1 clearly reveals that, when a positive-electrode active substance (valuable metal) which is hardly leached if a reducing agent is not supplied is leached using a positive electrode substrate (Al) as a reducing agent, an 85% reduction in reducing agent amount can be achieved. Since approximately 85% of Ni is leached out, in other words, approximately 85% of Ni is reduced, at least such amount of reducing agent does not need to be added, and hence it can be said that an approximately 85% reduction in reducing agent amount is achieved. The leaching rate was calculated by a formula, {(the amounts of Ni and Co in the leachate)}/{(the amounts of Ni and Co in the leachate)+(the amounts of Ni and Co remaining in the residue)}.

Note that a small amount of sodium sulfite was added to nickel and cobalt which were not leached out by the above-mentioned treatment and remained, whereby all the nickel and the cobalt were leached.

As mentioned above, according to Example 1, approximately 85% or more of nickel and approximately 85% or more of cobalt in a positive-electrode active substance can be leached out only by a positive electrode substrate made of aluminum foil, and the remaining nickel and cobalt are leached by a small amount of sodium sulfite, whereby almost 100% of leaching rates of nickel and cobalt can be achieved.

Comparative Example 1

A positive-electrode active substance (valuable metal) was leached under the same conditions as in Example 1, except that, in Comparative Example 1, the concentration of a sulfuric acid solution was 0.1 mol/l. Even after the lapse of 2 hours, almost all Al remained without being dissolved, and also the positive-electrode active substance (valuable metal) was not leached.

Hence, it is clearly understood that, by applying the conditions in Example 1 at the time of leaching out valuable metals, Al f a positive electrode substrate works as a reducing agent, whereby approximately 85% or more of valuable metals can be leached out.

Example 2

Next, an example of the valuable metal leaching method described in the above-mentioned second embodiment will be explained.

[Leaching Step]

100 g of a material resulting from battery-disassembly (Co: 56%, Li: 7%, F: 1.2%) obtained by crushing/shredding a lithium ion battery and then washing with water was mixed with 500 ml of pure water, and warmed until the temperature reached 80 degrees C.

Then, a sulfuric acid solution was added to this solution so that the solution had a pH of 1.0 to 1.5, and after that, while keeping the pH constant, a collected material (a material peeled-off from a substrate) collected from a nickel-metal hydride (Ni-MH) battery (Ni: 65%, Co: 6%, Mn: 3%, Al: 1.93%, La: 11%, Ce: 5%, Nd: 2%, Y: 1%, Pr: 0.4%) was added to the extent that an ORP (reference electrode: silver/silver-chloride electrode) was in a range of 500 to 550 mV, and made to react for 4 hours to form a slurry.

The slurry obtained after completing the reaction was filtered using a 5C filter paper with a sieve opening of 1 μm, and each component in the filtrate and a residue was analyzed by an ICP emission spectrophotometer (SPS3000 manufactured by SII Nano Technology Inc.) to calculate a leaching rate thereof. Table 1 shows the leaching out rate of each element contained in the leachate.

TABLE 1

|  | Ni (%) | Co (%) | Al (%) | La (%) | Ce (%) | Nd (%) | Y (%) | Mn (%) | Li (%) |
|---|---|---|---|---|---|---|---|---|---|
| Leaching-out Rate | 96.9 | 94.0 | 96.0 | 98.5 | 98.6 | 98.6 | 100.0 | 99.5 | 97 |

As shown in Table 1, a collected material collected from a nickel-metal hydride battery, such as nickel metal, was added in the leaching step, whereby Ni, Co, and Li, each of which was a valuable metal contained in a lithium ion battery, were leached out at a high leaching-out rate, namely, 96.7%, 94%, and 97%, respectively. The reason for this could be that the strong reducing effect of the added nickel metal enabled a positive-electrode active substance contained in the lithium ion battery to be decomposed effectively and leached out as a metal ion.

[Rare Earth Element Removal Step]

Next, 262 ml of the leachate obtained in the above-mentioned leaching step was heated to 65 to 70 degrees C. while being stirred at 300 rpm. Then, sodium sulfate decahydrate ($Na_2SO_4 \cdot 10H_2O$) was added as a de-RE (rare earth element) agent to be 1 equivalent with respect to the total number of moles of rare earth elements in the solution and further added so that the concentration of Na in a post-reaction solution was 6 g/l, and stirred for 15 minutes to precipitate and remove rare earth elements contained in the leachate. After the reaction was completed, a sample was filtered and $Na_2SO_4$ was added to the resulting filtrate, and then the slurry was filtered using a 5C filter paper with a sieve opening of 1 μm. Each component in the filtrate and a residue was analyzed by an ICP emission spectrophotometer (SPS3000 manufactured by S11 Nano Technology Inc.) to calculate a precipitation rate thereof.

Table 2 shows each amount of elements contained in a leachate before rare earth element removal reaction, Table 3 shows each amount of elements contained in the above-mentioned leachate after the rare earth element removal reaction (post-de-RE solution), and Table 4 shows a precipitation rate of a de-RE precipitate resulting from the rare earth element removal (de-RE) reaction.

As shown in Tables 2 to 4, by performing rare earth element removal reaction, 95% or more of rare earth elements (La, Ce, Nd) except yttrium were precipitated and removed without precipitating nickel, cobalt, and lithium, which were valuable metals contained in the leachate. The reason for this could be that addition of alkali sulfide, such as sodium sulfide, enabled only rare earth elements contained in the leachate to be efficiently precipitated and removed as a double sulfate.

[Neutralization Step and Sulfurizing Step]

Next, a post-reaction solution obtained through the rare earth element removal step (shown in the above-mentioned Table 3) was neutralized, and then nickel and cobalt were collected.

First, while 227 ml of a post-reaction solution obtained through the rare earth element removal step was stirred at 300 rpm at room temperature, 8 mol/l of NaOH solution was added thereto as a neutralizing agent to neutralize the solution to a pH of 4 (Neutralization Step).

Next, 1.1 equivalents of sodium sulfide ($Na_2S$) with respect to the content of nickel and cobalt contained in the post-reaction solution were added as a sulfurizing agent. During the addition of the sulfurizing agent, 64% by weight of sulfuric acid ($H_2SO_4$) solution was used for adjustment to a pH of 4. After the addition of the sulfurizing agent was completed, stirring was continued for 30 minutes while the pH was maintained at 4, whereby a sulfurization reaction was induced.

Table 5 shows each amount of elements contained in a post-reaction solution (post-sulfurization solution) at the time of completion of the sulfurization reaction and Table 6 shows each sulfurization precipitation rate of valuable metals formed by the sulfurization reaction. Table 7 shows the analysis value of the sulfide precipitate formed by the sulfurization reaction.

TABLE 2

|  | Ni (g/l) | Co (g/l) | Al (g/l) | La (g/l) | Ce (g/l) | Nd (g/l) | Y (g/l) | Mn (g/l) | Li (g/l) |
|---|---|---|---|---|---|---|---|---|---|
| Leachate | 47.0 | 77.0 | 1.40 | 11.0 | 5.70 | 1.50 | 0.87 | 3.50 | 7.8 |

TABLE 3

|  | Ni (g/l) | Co (g/l) | Al (g/l) | La (g/l) | Ce (g/l) | Nd (g/l) | Y (g/l) | Mn (g/l) | Li (g/l) |
|---|---|---|---|---|---|---|---|---|---|
| Post-de-RE Solution | 50.0 | 82.0 | 1.70 | 0.017 | 0.007 | 0.004 | 0.49 | 3.50 | 8.2 |

TABLE 4

|  | Ni (%) | Co (%) | Al (%) | La (%) | Ce (%) | Nd (%) | Y (%) | Mn (%) | Li (%) |
|---|---|---|---|---|---|---|---|---|---|
| De-RE Precipitate | 0.07 | 0.08 | 0.26 | 95.7 | 95.8 | 95.5 | 42.1 | 0.50 | 0.38 |

TABLE 5

|  | Ni (g/l) | Co (g/l) | Al (g/l) | La (g/l) | Ce (g/l) | Nd (g/l) | Y (g/l) | Mn (g/l) | Li (g/l) |
|---|---|---|---|---|---|---|---|---|---|
| Post-Sulfurization Solution | <0.001 | 0.001 | 0.50 | 0.004 | 0.002 | <0.001 | 1.20 | 0.20 | 3.3 |

TABLE 6

|  | Ni (%) | Co (%) | Al (%) | La (%) | Ce (%) | Nd (%) | Y (%) | Mn (%) | Li (%) |
|---|---|---|---|---|---|---|---|---|---|
| Sulfurization Precipitation Rate | 100.0 | 99.2 | 2.5 | <0.01 | <0.01 | <0.01 | <0.01 | 1.2 | 0.10 |

TABLE 7

|  | Ni (%) | Co (%) | Al (%) | La (%) | Ce (%) | Nd (%) | Y (%) | Mn (%) | Li (%) |
|---|---|---|---|---|---|---|---|---|---|
| Sulfide Precipitate | 20 | 32 | 0.12 | <0.01 | <0.01 | <0.01 | 0.13 | <0.01 | 0.03 |

As shown in Table 5 and Table 6, when the pH was maintained at 4 and 1.1 equivalents of a sulfurizing agent with respect to the content of nickel and cobalt were added, nickel and cobalt, which were valuable metals contained in the lithium ion battery, were almost perfectly precipitated and collected as sulfide precipitates.

Also, as shown in Table 7, rare earth elements including yttrium were made to remain in a solution without being mixed into sulfide precipitates, whereby a sulfide having a good quality was formed. The reason for this could be that, in the sulfurization reaction, the pH of the reaction solution was able to be controlled appropriately.

[pH and Amount of Sulfurizing Agent Added in Sulfurizing Step]

Here, the pH and the amount of a sulfurizing agent added at the time of the sulfurization reaction in the sulfurizing step were investigated as follows.

Figure 3:
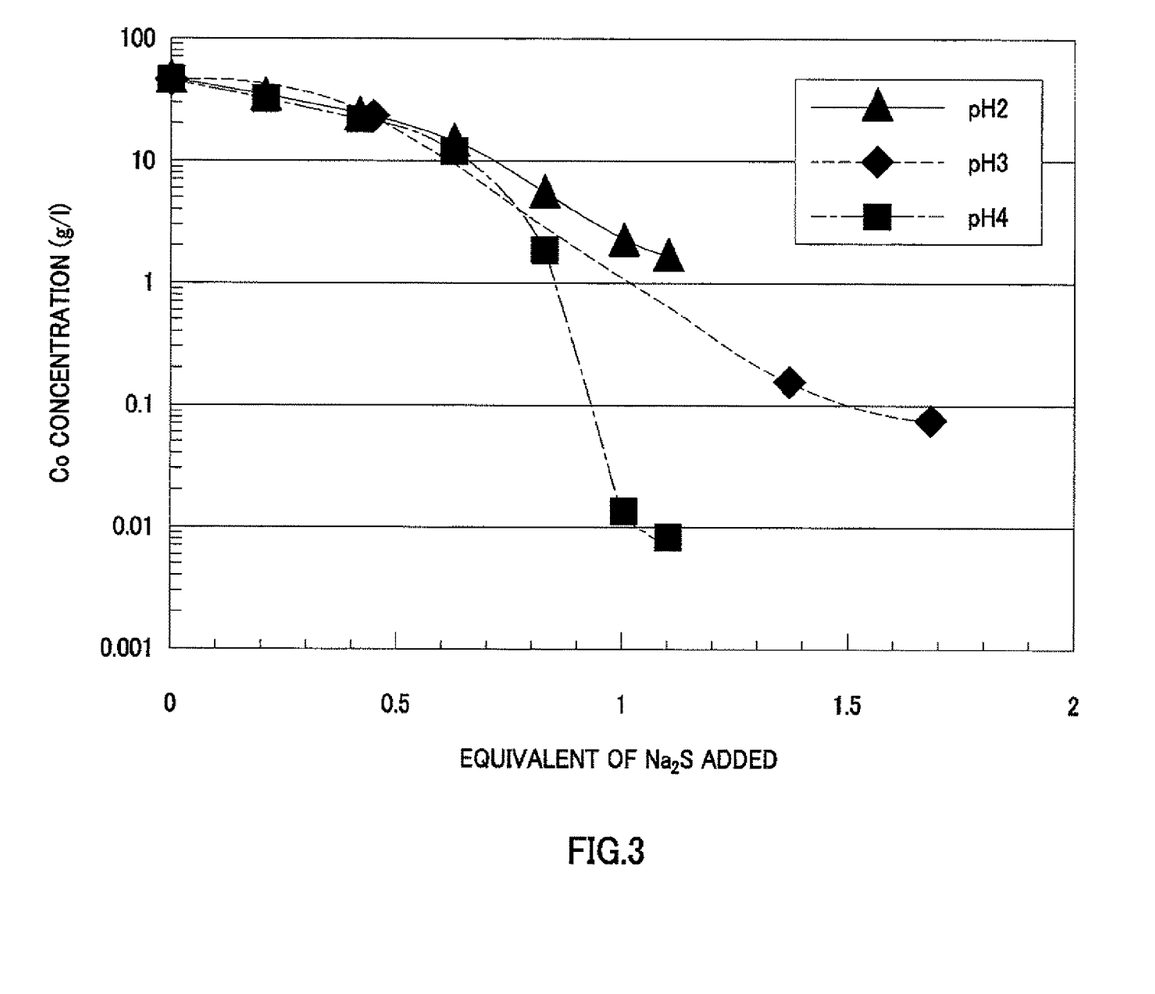
FIG. 3 is a graph showing the variation in concentration of cobalt in a reaction solution with respect to the amount of a sulfurizing agent added when the pH is changed in a sulfurization reaction.

First, in the above-mentioned sulfurization reaction, each pH at the time of the sulfurization reaction was adjusted to 2.0, 3.0, and 4.0, and the concentration of cobalt in a solution was investigated. FIG. 3 shows the results.

As understood from the results in FIG. 3, when the pH of a sulfurization reaction solution was adjusted to any one of 2.0, 3.0, and 4.0, the amount of a cobalt sulfide formed was able to be increased by increasing the amount of Na$_2$S added, and the concentration of cobalt in the solution was able to be reduced. Especially, when the pH of the solution is adjusted to 4.0, the concentration of the cobalt in a solution was able to be 0.01 g/l or less by adding approximately 1.1 equivalent Na$_2$S, and, with a less amount of a sulfurizing agent added than in other pH conditions, approximately all cobalt in the solution was able to be sulfurized.

Figure 4:
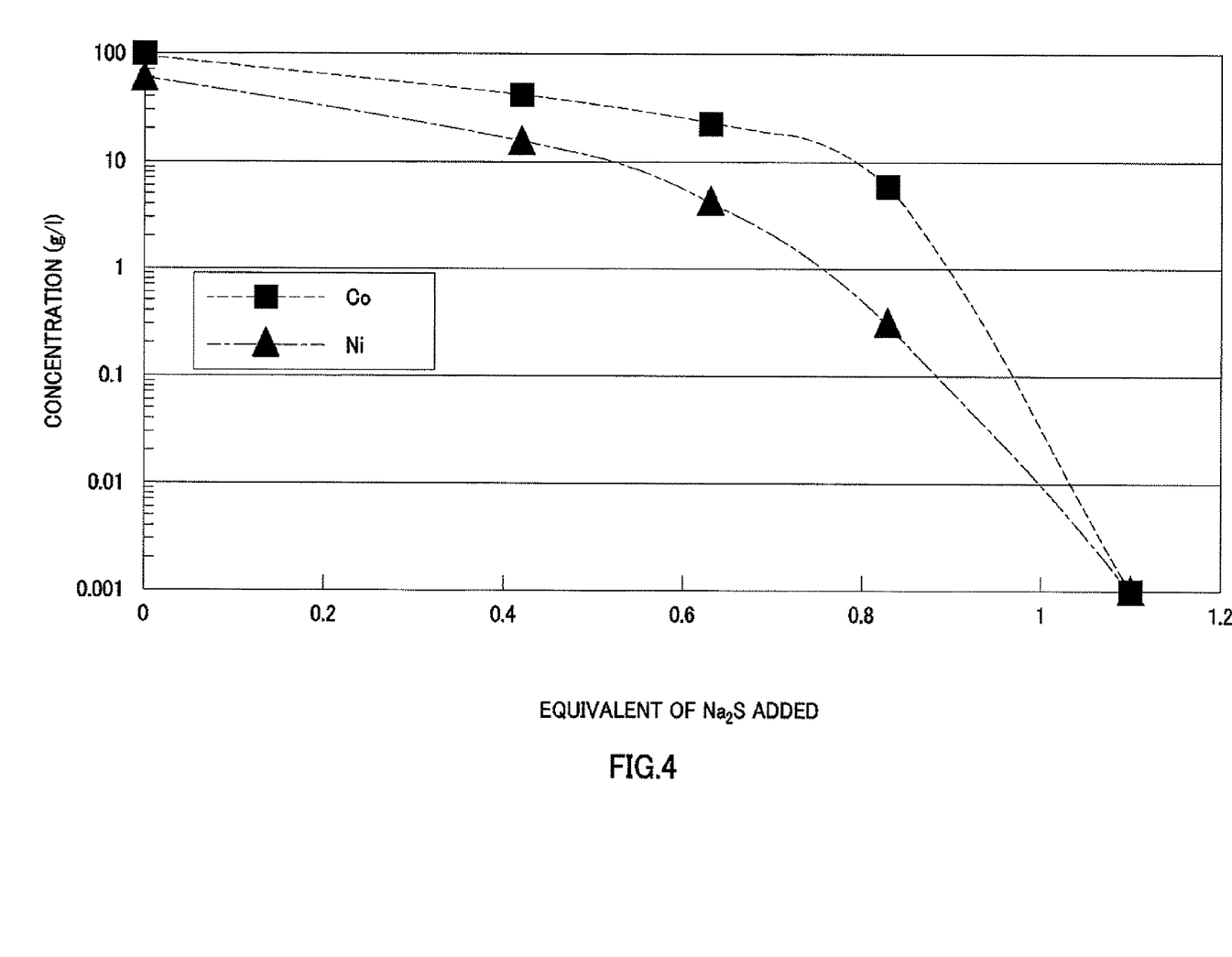
FIG. 4 is a graph showing variation of each concentration of nickel and cobalt with respect to the amount of a sulfurizing agent ($Na_2S$) added in a sulfurization reaction.

Next, a relation between the amount of Na$_2$S added as a sulfurizing agent and each concentration of nickel and cobalt in the solution was investigated in more detail. Specifically, with adjusting the pH of the solution to 4.0 and changing the amount of Na$_2$S added, the variation in each concentration of nickel and cobalt was investigated. FIG. 4 shows the results.

As understood from the results in FIG. 4, an increase in the amount of Na$_2$S added as a sulfurizing agent enabled each concentration of nickel and cobalt in the solution to be reduced. Also, when the amount of Na$_2$S added was 1.1 equivalents, sulfides of approximately all nickel and cobalt contained in the solution were formed, and each concentration of nickel and cobalt in the solution was able to be decreased to approximately 0.001 g/l or less.

The invention claimed is:

1. A valuable metal leaching method of leaching out valuable metals comprising nickel, cobalt, and lithium contained in a positive electrode material of a lithium ion battery,
    wherein the positive electrode material is immersed in an acidic solution together with a metal having a lower reduction potential than a reduction potential of hydrogen, whereby the valuable metals are leached out from a positive-electrode active substance,
    wherein the metal having a lower reduction potential than a reduction potential of hydrogen is nickel metal obtained from a nickel-metal hydride battery,
    wherein an alkali sulfate is added to a leachate obtained by a leaching step, thereby removing a rare earth element contained in said leachate as a double sulfate, and
    wherein a sulfurizing agent is added to a mother liquor obtained through a rare earth element removal step, and, with adjusting a pH of said mother liquor to 2 to 5, a mixed sulfide of nickel and cobalt is formed.

2. The valuable metal leaching method according to claim 1, wherein the positive electrode material is immersed in the acidic solution to dissolve the positive-electrode active substance and a positive electrode substrate having the positive-electrode active substance adhering thereto, whereby the valuable metals are leached out from the positive-electrode active substance.

3. The valuable metal leaching method according to claim 2, wherein the positive electrode substrate is aluminum foil.

4. A valuable metal collection method of collecting valuable metals comprising nickel, cobalt, and lithium contained in a positive electrode material of a lithium ion battery, the method comprising:
    a leaching step of leaching out the valuable metals from a positive-electrode active substance by immersing the positive electrode material in an acidic solution together with a metal having a lower reduction potential than a reduction potential of hydrogen,
    wherein the metal having a lower reduction potential than a reduction potential of hydrogen is nickel metal obtained from a nickel-metal hydride battery,
    a rare earth element removal step, wherein an alkali sulfate is added to a leachate obtained by the leaching step, thereby removing a rare earth element contained in said leachate as a double sulfate, and a sulfurizing step, wherein a sulfurizing agent is added to a mother liquor obtained through the rare earth element removal step, and, with adjusting a pH of said mother liquor to 2 to 5, a mixed sulfide of nickel and cobalt is formed.

5. The valuable metal collection method according to claim 4, wherein the positive electrode material is immersed in the acidic solution to dissolve the positive-electrode active substance and a positive electrode substrate having the positive-electrode active substance adhering thereto, whereby the valuable metals are leached out from the positive-electrode active substance.

6. The valuable metal collection method according to claim 5, wherein the positive electrode substrate is aluminum foil.

7. The valuable metal collection method according to claim 4, the method further comprising:

a neutralization step, wherein, before the sulfurizing step, the leachate obtained by the leaching step is neutralized by a neutralizing agent, and a metal impurity contained in the leachate is thereby separated and collected as a precipitate.

* * * * *